United States Patent [19]
Swenson et al.

[11] 3,740,014
[45] June 19, 1973

[54] ADJUSTABLE SEAT ASSEMBLY FOR VEHICLE

[75] Inventors: Richard F. Swenson, Milwaukee; Claude B. Hisey, West Allis, both of Wis.

[73] Assignee: Swenson Corporation, Red Granite, Wis.

[22] Filed: Jan. 20, 1972

[21] Appl. No.: 219,339

[52] U.S. Cl. ............... 248/373, 248/393, 248/429, 297/294
[51] Int. Cl. ............................................. F16m 7/24
[58] Field of Search .................. 248/373, 372, 374, 248/393, 424, 429; 297/294, 295

[56] References Cited
UNITED STATES PATENTS

| | | | |
|---|---|---|---|
| 2,783,822 | 3/1957 | Hickman et al. | 248/374 |
| 2,868,273 | 1/1959 | Barrett | 248/424 |
| 2,986,199 | 5/1961 | Ferreira et al. | 248/429 |
| 2,998,054 | 8/1961 | Radke et al. | 248/374 |
| 3,036,805 | 5/1962 | Hickman | 248/373 |
| 3,338,543 | 8/1967 | Stuckenberger et al. | 248/373 |

FOREIGN PATENTS OR APPLICATIONS

| | | | |
|---|---|---|---|
| 360,011 | 10/1931 | Great Britain | 248/429 |
| 828,985 | 2/1960 | Great Britain | 248/429 |

*Primary Examiner*—Marion Parsons, Jr.
*Attorney*—James E. Nilles

[57] ABSTRACT

An adjustable seat assembly for a vehicle comprises a pair of spaced-apart parallel support tubes which are mounted on the vehicle by means of a support bracket. Seat attachment means are provided and include a seat attachment plate and a pair of seat tubes which are slidably or telescopically engageable with the front ends of the tubes. A U-shaped torsion bar has two reversely-curved ends which are slidably or telescopically engageable with the rear ends of the seat tubes. Means are provided for bolting a seat to an attachment plate underlying the U-shaped end of the torsion bar so as to entrap the U-shaped end of the torsion bar therebetween. The seat, seat attachment means and torsion bar are slidable as a unit longitudinally with respect to the support tubes to desired positions. A spring-biased notched locking bar is pivotably connected to the attachment means and any one of its notches can engage the edge of slot in the tube support bracket to lock the seat in a desired position.

12 Claims, 6 Drawing Figures

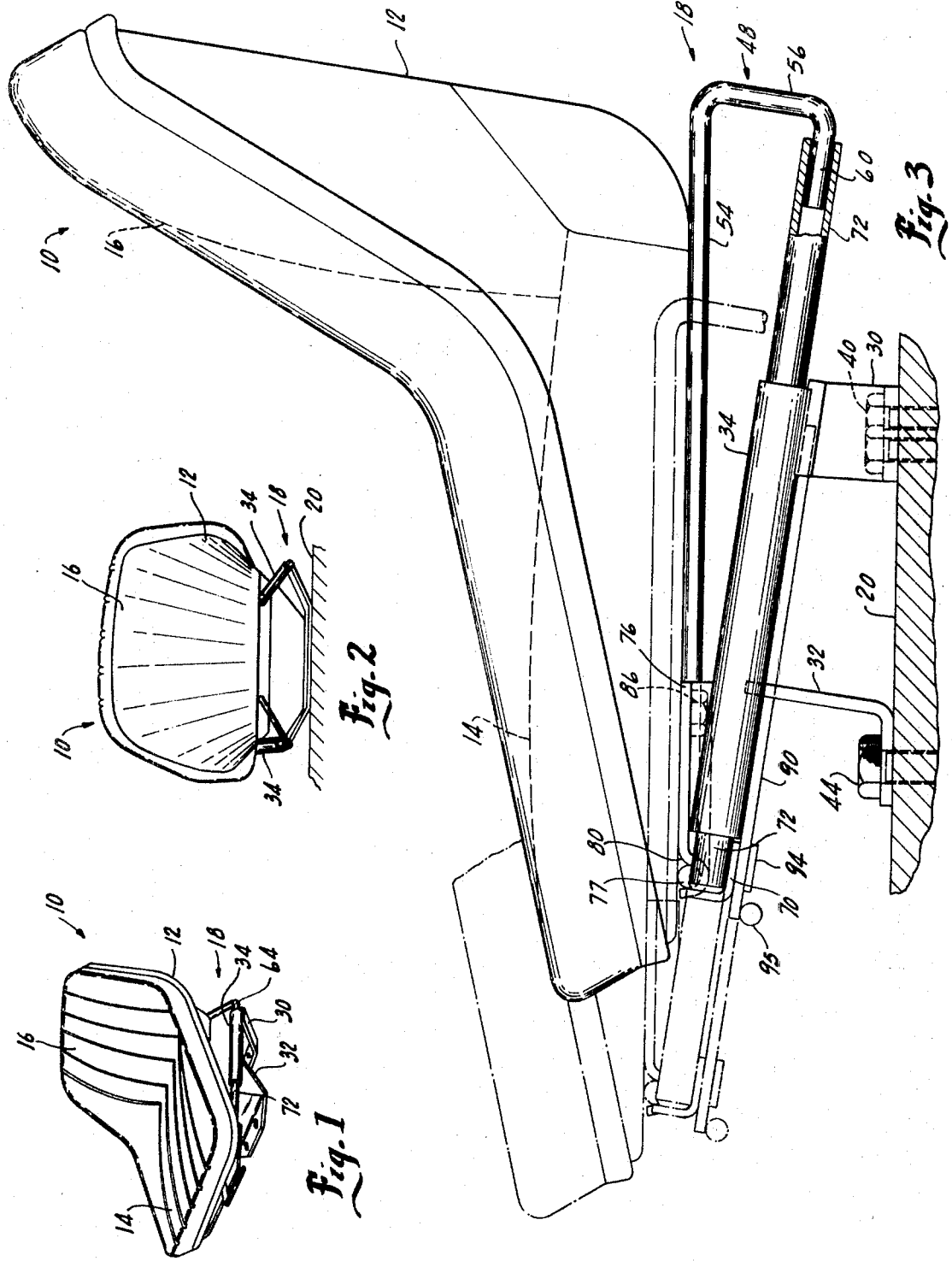

ADJUSTABLE SEAT ASSEMBLY FOR VEHICLE

BACKGROUND OF THE INVENTION

1. Field of Use

This invention relates generally to adjustable seat assemblies for vehicles such as tractors or the like.

2. Prior Art

Vehicles such as tractors, farm machines, construction machines or the like often require an operator's seat which is comfortable, easy-riding and adjustable to various positions. The prior art discloses numerous examples of seat assemblies designed with these needs in mind. For example, U.S. Pat. No. 2,715,938 shows a horizontally, vertically and angularly adjustable tractor seat assembly having conventional shock-absorber means. U.S. Pat. No. 3,163,409 shows a boat seat assembly having a type of torsion bar suspension and which can be tilted forward. U.S. Pat. No. 2,921,621 shows an automobile seat assembly which is horizontally and vertically adjustable but which is non-resilient, except for cushioning in the seat itself. While these and similar seat assemblies are apparently suitable for their intended purpose, it is desirable to provide improved adjustable seat assemblies for vehicles.

SUMMARY OF THE INVENTION

An adjustable seat assembly in accordance with the present invention is especially well adapted for use on vehicles such as tractors or similar rough-terrain vehicles but could have other uses.

The seat assembly comprises means, including at least one longitudinally disposed member such as a tube, which is adapted to be rigidly secured in a fixed position on the vehicle. The seat assembly also comprises seat attachments means which is mounted on the support means and is longitudinally movable to desired positions with respect thereto. In practice, the seat attachment means comprises a frame and a seat attachment plate and at least one seat tube mounted on the frame. The seat assembly further comprises torsion bar means mounted on the support means and longitudinally movable to desired positions with respect thereto. In practice, one end of the torsion bar is slidably or telescopically engaged in the end of the seat tube and another portion of the torsion bar is reversely-curved so as to lie generally adjacent the support tube. The attachment plate, preferably pivotable with respect to the frame, underlies the said portion of the torsion bar and the seat tube is slidable or telescopically engaged in the front end of the support tube. Connection means are provided to secure a seat to the seat attachment plate so that the free end of the torsion bar is trapped between the seat and the plate so that the seat, seat attachment means and torsion bar means are movable as a unit longitudinally to various positions with respect to the support means or tube. Finally, releasable means are provided to lock the movable unit in any one of a plurality of predetermined longitudinal positions with respect to the support means. In practice, such means comprise a spring-biased locking bar pivotally connected to the frame of the seat attachment means and having positioning notches thereon which are engageable with a side of a slot in some portion of the support means.

In a preferred embodiment of the invention, the support means comprises a support bracket on which a pair of spaced-apart parallel support tubes are mounted. The seat attachment means comprises a pair of seat tubes for sliding or telescopic engagement with the front ends of the support tubes. The torsion bar takes the form of a generally U-shaped member having reversely-curved ends, which slidably or telescopically engage the rear ends of the seat tubes.

An adjustable resilient vehicle seat assembly in accordance with the invention embodies the features of horizontal and vertical adjustment, and an improved type of torsion bar suspension which provides improved support for the seat. Furthermore, the seat assembly is comfortable, sturdy, readily adjustable to various positions without tools, non-complicated and can be easily and economically manufactured from stock materials.

DRAWINGS

FIG. 1 is a left-front perspective view of a vehicle seat assembly in accordance with the invention;

FIG. 2 is a left-rear perspective view of the assembly;

FIG. 3 is an enlarged side elevational view of the assembly showing it in extreme rearward position and also showing it, in phantom view, in extreme forward position;

DESCRIPTION OF A PREFERRED EMBODIMENT

Figure 4:
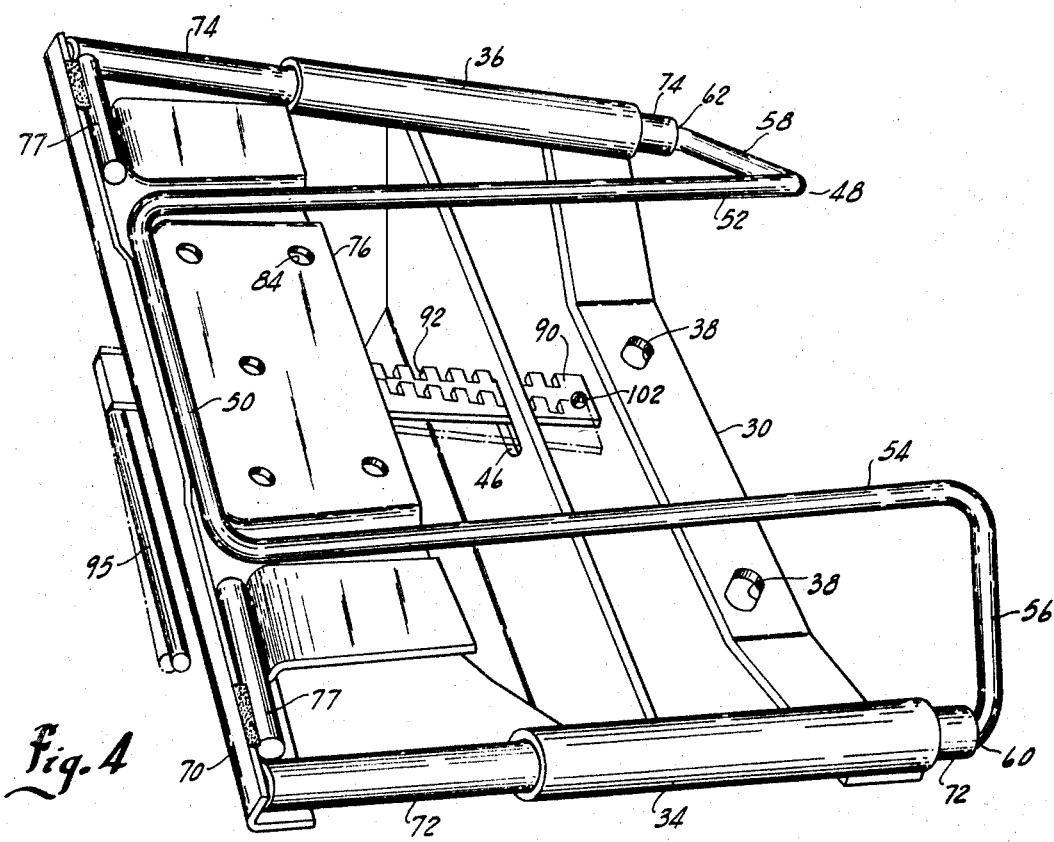
FIG. 4 is a left front perspective view of the upper side of the assembly with the seat removed.
Figure 5:
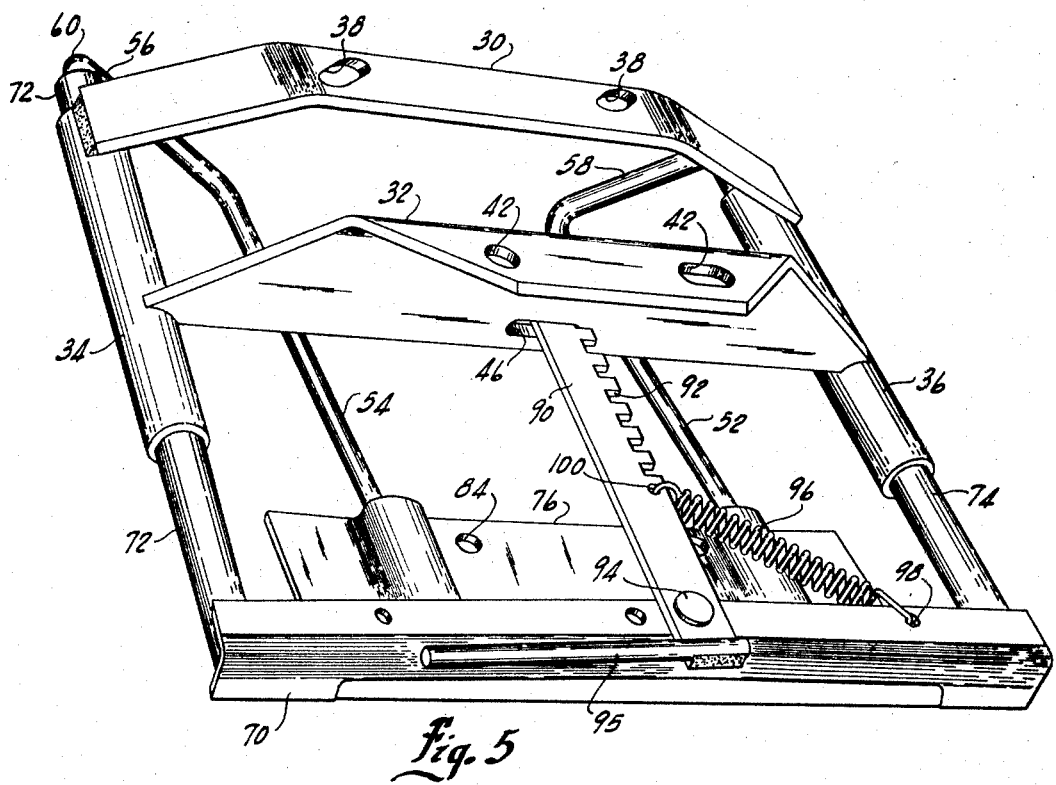
FIG. 5 is a perspective view of the lower side of the assembly with the seat removed.

Referring to FIGS. 1, 2 and 3, the numeral 10 designates an adjustable resilient vehicle seat assembly in accordance with the invention. Assembly 10 comprises a seat means or seat 12 in the form of an upholstered bucket seat having a weight-supporting portion 14 and a back-rest portion 16. Assembly 10 further comprises a supporting structure 18 on which seat 12 is mounted and which is itself secured to a portion 20 (FIGS. 2 and 3) of a vehicle such as a tractor.

Figure 6:
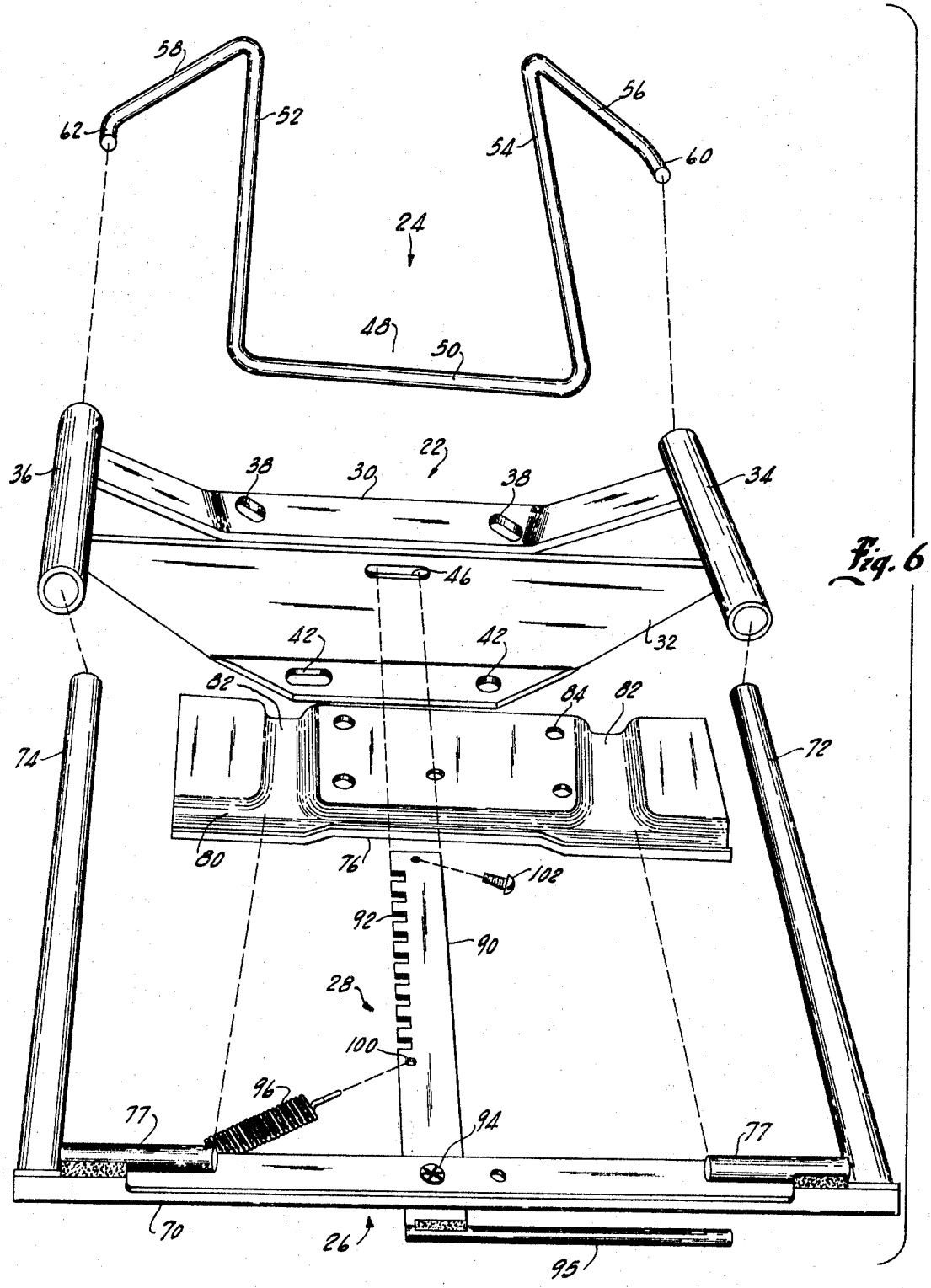
FIG. 6 is a front perspective exploded view of the assembly with the seat removed.

As FIG. 6 best shows, structure 18 comprises a support means 22, a torsion bar means 24, a seat attachment means 26, and releasable locking means 28, all hereinafter described in detail.

FIG. 3 shows support means 22 rigidly secured in fixed position to portion 20 of the vehicle. As FIGS. 3 through 6 show, support means 22 comprises bracket means including a rear support bracket 30 and a front support bracket 32, and further comprises two spaced-apart parallel longitudinally disposed members in the form of open-ended tubes or telescopic members 34 and 36 which are rigidly secured to the ends of the brackets 30 and 32. Rear bracket 30 takes the form of a strip of metal having a flat center portion with a pair of holes 38 therein for receiving mounting bolts, such as bolt 40 shown in FIG. 3. Rear bracket 30 has end portions which extend upwardly at an angle and are secured as by welding to the tubes 34 and 36. Front bracket 32 takes the form of a piece of angle iron having a flat bottom portion with a pair of holes 42 therein for receiving mounting bolts, such as bolt 44 shown in FIG. 3. Front bracket 32 has a trapezoidally-shaped upright portion which has its end secured as by welding to the tubes 34 and 36. Front bracket 32 and rear bracket 30 are proportioned so that when the bracket means of which they are a part is mounted level, the front ends of the tubes 34 and 36 are slightly higher than the rear ends. The upright portion of front bracket 32 is provided with a centrally located slot 46, shown in FIGS. 4, 5 and 6, which is part of a releasable locking means hereinafter described.

The torsion bar means 24, shown in FIGS. 3 through 6, comprises a one-piece torsion bar 48 having a generally U-shaped portion comprising an intermediate section 50 and side sections 52 and 54. Torsion bar 48 further comprises two reversely-curved end portions which comprise outwardly extending sections 56 and 58, and forwardly extending end sections 60 and 62, respectively. The end sections 60 and 62 of torsion bar 48 make snug sliding or telescopic engagement with the rear ends of the tubes 72 and 74, respectively, of the support means. With the ends of torsion bar 48 inserted in the tubes 72 and 74, the U-shaped portion of the torsion bar is relatively free-moving and resilient. The side sections 52 and 54 of torsion bar 48 are arranged so that when the bracket means are mounted level, the sections 52 and 54 are also substantially level with the horizontal. As hereinafter explained, the torsion bar means 24 are slidably adjustable forwardly and rearwardly with respect to support means 22 to desired positions.

Seat attachment means 26, best seen in FIGS. 3, 4, 5 and 6, comprises a laterally disposed frame member 70, such as a length of angle iron, to which a pair of rearwardly extending parallel spaced apart tubes 72 and 74 are rigidly secured as by welding. The tubes 72 and 74 are adapted to be slidably engageable with or telescopic within the openings in the front ends of the tubes 34 and 36, respectively, of support means 22. Seat attachment means 26 further comprises a seat attachment plate 76 which is pivotably attached to frame member 70 by means of a pair of cylindrical pins 77 which are secured as by welding along part of their length to the inner surface of the vertical portion of frame member 70. As FIG. 6 best shows, plate 76 is provided with a laterally disposed groove 80 along its front edge which adapts it to be pivotably entrapped between the pins 77 on frame member 70 and a side of member 70. PLate 76 underlies the free-moving U-shaped end of torsion bar 48 and the central portion of groove 80 accommodates section 50 thereof. Plate 76 is also provided with a pair of longitudinally disposed grooves 82 in which the sections 52 and 54 of torsion bar 48 lie. Plate 76 is provided with a plurality of bolt holes 84 for accommodating bolts, such as bolt 86 shown in FIG. 3, by means of which seat 12 is secured to the seat attachment means 26, i.e., to attachment plate 76. When seat 12 is secured to seat attachment means 26, the free U-shaped portion of torsion bar 48 is entrapped between plate 76 and the seat bottom and affords resilient vertical support for the seat. The sections 52 and 54 of torsion bar 48 bear on the underside of seat 12 and furnish support therefor. The rear end of torsion bar 48 is able to flex and therefore provides a resilient suspension for seat 12. More specifically, the sections 56 and 58 of torsion bar 48 can move arcuately as the torsion bar ends 60 and 62, respectively, in the tubes 72 and 74, respectively, pivot therein. The sections 52 and 54 of torsion bar 48, and particularly the rear ends thereof, are correspondingly movable because they are not rigidly secured to the bottom rear of seat 12. Movement of sections 52 and 54 of torsion bar 48 is also enhanced by the fact that seat attachment plate 76 is vertically pivotable to a limited degree with respect to frame member 70 of seat supporting means 26.

With seat 12 secured to plate 76, the seat, the seat supporting means 26 and the torsion bar means 24 are movable as a unit in the forward and rearward directions with respect to support means 22. AS FIG. 3 makes clear, forward adjustment causes a slight increase in elevation of seat 12 and rearward adjustment causes a slight decrease in the height of the seat. This is desirable because it places the vehicle operator's legs in a preferred position with respect to pedal controls.

The releasable locking means 28 permit seat 12, and all components longitudinally movable therewith, to be adjusted or moved longitudinally to desired positions and then be locked in place therein. Locking means 28 comprises a longitudinally disposed locking bar 90 having a plurality of notches 92 in one edge there of which is pivotably attached at its forward end by a rivet 94 to the underside of frame member 70 of seat attachment means 26. Locking bar 90 extends rearwardly through slot 46 in front support bracket 32 of support means 22 and is pivotable laterally to a position wherein one of its notches 92 can engage the side of the slot. This engagement prevents forward or rearward movement of seat 12 or any components movable therewith. Locking bar 90 is provided with an operating handle 95 in the form of a rod which is attached as by welding to the forward end of the locking bar so as to be readily accessible to the vehicle operator. As FIG. 4 shows, a small degree of clockwise movement of handle 95 effects corresponding movement of locking bar 90 and disengagement of a notch 92 from the side of slot 46 so that seat 12 (and components movable therewith) can be adjusted by being slid forward or rearward to another position. Releasable locking means 28 further comprises biasing means, such as a coiled tension spring 96, which maintains locking bar 90 locked in a desired position. Spring 96 has one end engaged with a hole 98 in member 70 of seat attachment means 26 and has it other end engaged with a hole 100 in locking bar 90. Spring 96 tends to bias locking bar 90 counterclockwise with respect to FIG. 4. Locking bar 90 is provided with a bolt or screw 102 which serves as a keeper to prevent inadvertent withdrawal of the bar from lot 46 by moving seat 12 too far forward.

In the embodiment shown, the ends of the torsion bar 48 and the tubes 72 and 74 of the seat attachment means 26 are shown as telescoping within the tubes 34 and 36 of the support means 22. However, it is within the scope of the present invention that components 34 and 36 telescope within members 72 and 74 and the ends of the torsion bar 48, provide that the latter components are hollow.

RESUME

An adjustable seat assembly for a vehicle comprises support means for rigid attachment to the vehicle. The support means comprise bracket means on which at least one telescoping member, such as a tube, are mounted. Seat attachment means are provided and comprises a frame member on which an attachment plate and at least one seat tube are mounted. The seat tube is telescopically or slidably engageable with the front end of the tube. A torsion bar is provided which has one end telescopically or slidably engageable with the rear end of the seat tube and a reversely-curved free portion disposed alongside the support tube. Means are provided to attach or secure the attachment plate to the bottom of a seat so that the seat, seat attachment means and torsion bar are slidably movable as a unit longitudinally (forwardly and rearwardly) with respect to the tube of the support means to desired positions. Releasable locking means are provided to secure the seat and components movable therwith in desired positions. The locking means comprise a spring-biased notched member pivotably attached to the frame of the seat attachment means and engageable with the bracket means of the support means.

In use, the torsion bar affords resilient vertical support for the seat along the length of the undersurface of the seat. Connection between movable components are sturdy and secure but allow for sufficient relative movement to ensure a well-sprung seat. The releasable locking means are out of the operator's way but readily accessible to permit longitudinal and vertical adjustment of the seat.

We claim:

1. A seat assembly for a vehicle comprising:
   a seat;
   support means comprising a support bracket and a pair of spaced apart tubular members rigidly mounted thereon,
   said support means adapted to be rigidly secured in a fixed position on said vehicle by said support bracket;
   seat attachment means comprising a pair of seat attachment tubes connected by an intermediate portion,
   said pair of seat attachment tubes slidably engaged within said pair of tubular members;
   an attachment plate pivotally mounted on said intermediate portion;
   torsion bar means comprising a pair of end portions and a resilient intermediate portion,
   said pair of end portions engaged with the rear ends of said pair of attachment tubes of said seat attachment means;
   and means for securing said attachment plate to said seat with said resilient portion of said torsion bar disposed between said seat and said attachment plate.

2. A seat assembly according to claim 1 wherein said intermediate resilient portion of said torsion bar means is reentrant and lies adjacent said tubular members of said support means.

3. A seat assembly according to claim 2 wherein said attachment plate is secured near the front of said seat and said seat rests on said intermediate portion of said torsion bar means.

4. A seat assembly according to claim 3 wherein said seat attachment means and said torsion bar means are movable as a unit and including releasable locking means for holding said unit in any one of a number of predetermined positions with respect to said support means.

5. A seat assembly according to claim 4 wherein said releasable locking means comprises a locking bar pivotably connected to said intermediate portion of said seat attachment means, said locking bar being provided with notches for engaging said support bracket of said support means, and biasing means for biasing said locking bar into engagement with said support bracket.

6. A seat assembly for a vehicle comprising:
   a seat;
   support means including at least one support means member adapted to be rigidly secured in fixed position on said vehicle;
   seat attachment means including at least one seat attachment member slidably mounted on said support means member and further including an attachment plate pivotally connected to said seat attachment member;
   torsion bar means connected to said seat attachment member and having a resiliently movable portion for resiliently supporting said seat;
   and means for securing said seat to said attachment plate with said resilient portion of said torsion bar means being disposed between said seat and said attachment plate, said seat, said seat attachment means and said torsion bar means being movable as a unit to any one of predetermined positions with respect to said support means.

7. A seat assembly according to claim 6 including releasable locking means connected between said seat attachment means and said support means for maintaining said unit in any one of said predetermined positions.

8. A seat assembly according to claim 6 wherein said support means member and said seat attachment member are telescopically engaged with each other.

9. A seat assembly according to claim 8 wherein said support means member is tubular and wherein said seat attachment member extends into one end thereof.

10. A seat assembly for a vehicle comprising:
    a seat;
    support means including a pair of spaced apart support means members adapted to be rigidly secured in a fixed position on said vehicle;
    seat attachment means comprising seat attachment members slidably engaged with said pair of support means members and further comprising a portion connecting said seat attachment members,
    said seat attachment means further comprising an attachment plate pivotally connected to said connecting portion of said seat attachment means;
    torsion bar means comprising two end portions connected to said seat attachment members and further comprising a resiliently movable portion;
    and means for securing said attachment plate to said seat with said resiliently movable portion of said torsion bar means being disposed between said seat and said attachment plate.

11. A seat assembly according to claim 10 wherein said seat attachment means and said torsion bar means are movable as a unit and including releasable locking means connected between said support means and said seat attachment means for holding said unit in any one of a number of predetermined positions with respect to said support means.

12. A seat assembly according to claim 11 wherein said support means members are tubular members and wherein said seat attachment members extend therewithin.

* * * * *